Dec. 11, 1934.  W. L. FRAMPTON  1,983,901
POWER TRANSMISSION DEVICE
Filed Jan. 31, 1933    2 Sheets—Sheet 1
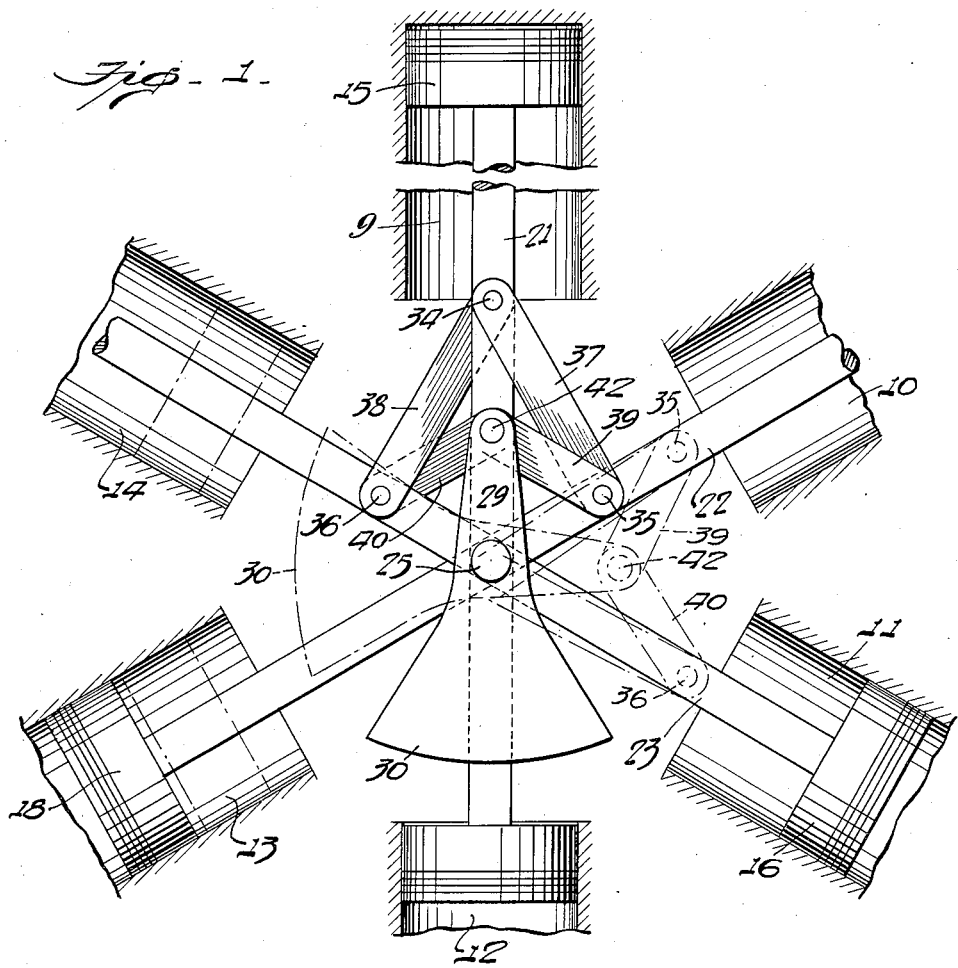
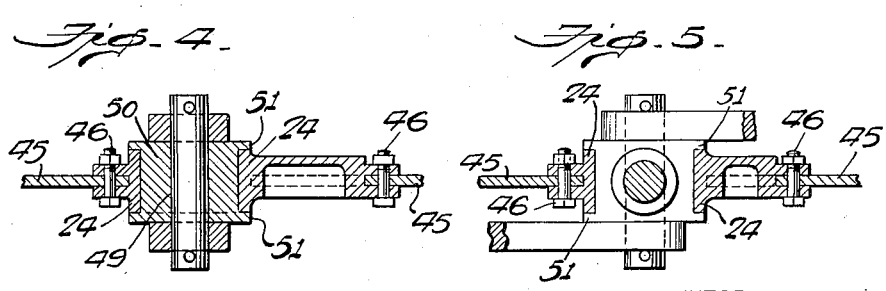
INVENTOR
William L. Frampton
BY
H. H. Snelling
ATTORNEY

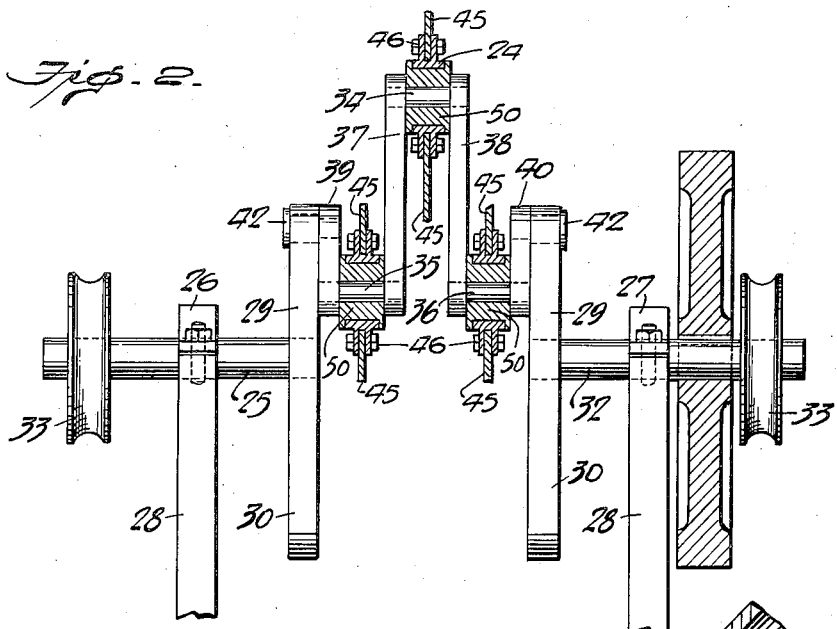
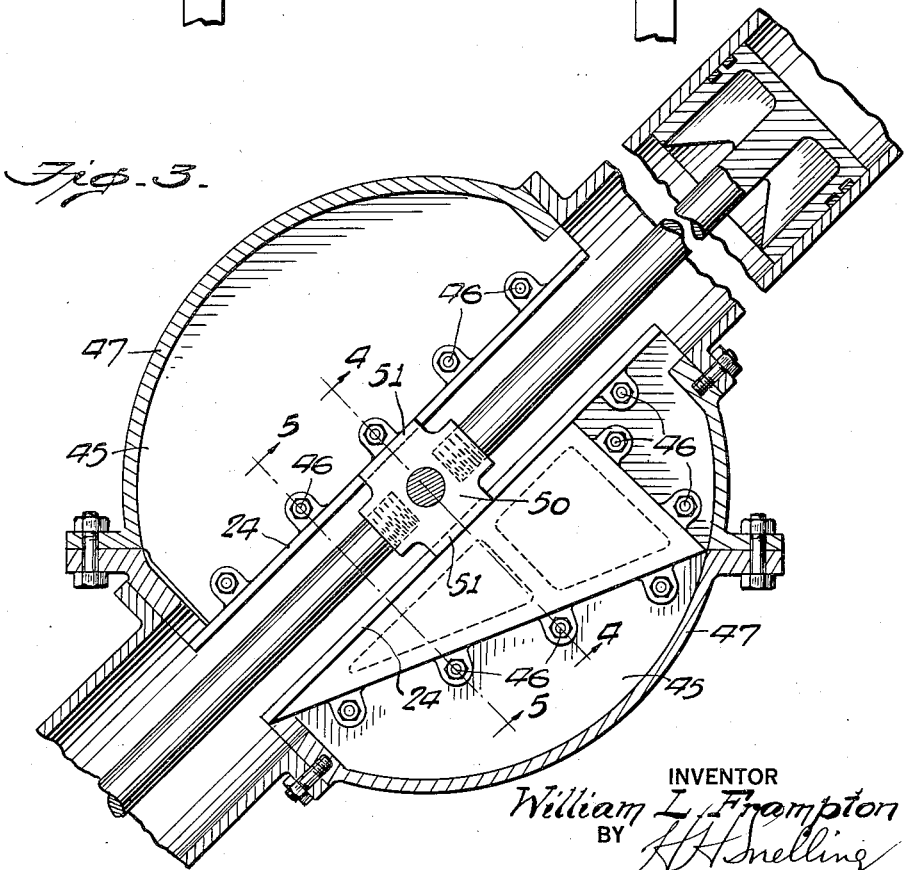

Patented Dec. 11, 1934

1,983,901

UNITED STATES PATENT OFFICE 1,983,901

POWER TRANSMISSION DEVICE

William L. Frampton, Lincoln, Nebr.

Application January 31, 1933, Serial No. 654,499

7 Claims. (Cl. 74—44)

This invention relates to power transmission devices and has for its principal object the provision of a reversible combination wherein a plurality of pistons are either driven by a shaft as, for example, in pumps, or where the pistons drive the shaft as in an engine.

A primary object of the invention is to provide a power transmission device employing pistons in which the pistons are relieved of much of the side thrust, this being due to the transfer of all side thrust to the crank pin bearing which slides on a removable guide or aligner provided to take this thrust.

A further object is to provide a renewable crank case aligner which takes all the wear caused by said side thrust.

A still further object is to simplify engine construction generally by means of a crank shaft of unusual design which crank shaft for convenience is hereafter called the contra shaft because it revolves in an opposite direction from the main shaft whether the latter be the driver or the driven member.

My invention may be adapted to an engine or pump of two or any number of cylinders above two, the angle of the cylinders with respect to each other being determined by dividing the circle by two times the number of cylinders to be used.

For convenience in illustrating and describing the invention which is of general purpose I have selected a very simple form and have eliminated all details which can readily be added by skilled mechanics, but I wish it understood that the invention is to be limited only as called for in the claims.

In the drawings:—

Figure 1 is a diagrammatic view looking in the direction of the axis of the main shaft.

Figure 2 is an end view.

Figure 3 is a transverse section of my improved crank case showing one of the aligners.

Figures 4 and 5 are details.

The cylinders 9 to 14 are preferably exactly alike, firing in the order of their numerals and housing pistons such as 15, 16, 17 and 18; opposite pistons such as 15 and 17 being rigidly connected together by rods 21, 22 and 23 which in the engines I have made are guided centrally by aligners 24.

The main shaft 25 is mounted in a bearing 26 in frame 28 and has rigidly attached to it an end crank arm 29 preferably carrying an integral counterbalance 30. I prefer that the frame 28 shall carry in its opposite pedestal a bearing 27 similar to the bearing 26 and in this bearing I mount a shaft 32 rigidly attached to a crank arm 29 so that these two shafts 25 and 32 may each be considered as the main shaft and they are coaxial. Power is transmitted to either or both ends of the main shaft, i. e., to the shaft 25 or the shaft 32 or both as, for example, by the pulleys 33 or these pulleys 33 may be utilized for the transmission of power to the two main shafts.

The contra shaft consists of three crank pins 34, 35 and 36 spaced apart by two central elongated crank arms 37 and 38 while the shorter crank arms 39 and 40, which are end cranks, connect the crank pins 35 and 36 with the cranks 29 by means of wrist pins 42 fixedly carried by the end cranks 39 and 40 and extending into or thru bearings in the main shaft cranks 29. The contra shaft is properly counterbalanced as shown.

In order that the crank pins 34, 35 and 36 shall travel only in straight lines I provide aligners 24 which are exactly parallel to the cylinder walls. These aligners 24 may be substantially channel shaped members which are supported by and removably connected to webs or struts 45 as by bolts or other securing means 46. Some or all of these webs may be integral parts of the crank case 47 but for purposes of easy removal and installation of the crank shafts a portion of each web 45 should be removable or if desired one of the aligners of each pair may itself constitute a removable web as shown in Figure 3. The weight of the crank case can be reduced by providing skeleton webs and removable aligners and this open construction is especially desirable in the lower part of the crank case as it allows better circulation of oil. Braces 48 may be provided at points along the aligners to prevent spreading action due to side thrust, otherwise the forces so set up would have to be resisted entirely by the crank case which would therefore require considerable reinforcing thereby adding objectionable weight to the engine. The crank bearings 49 are carried in suitable cross heads 50 which are provided with shoes 51 of ample bearing surface; these shoes may be channel shaped to fit over the aligners if desired but this expedient is not believed to be necessary except for facilitating assembly as there is rarely any force acting longitudinally of the crank pins.

Because of the structure illustrated and described the piston travels directly or rather coaxial with the cylinder reducing to a minimum the wear occasioned by side thrust against opposite walls of the cylinder, the pistons substantially floating in their cylinders. In view of this absence of side thrust both the piston and the connecting rod may be built considerably lighter than in conventional types and in addition the piston may be made quite short.

The device will be described beginning with the parts in the position shown in Figure 1. Cylinder 9 is almost ready to fire, the charge being so arranged that the valves are timed to commence the stroke shortly after the passing of the dead center position illustrated, a fly wheel being preferable but not illustrated for the sake of simplicity. The firing of cylinder 9 causes the piston 15 to descend carrying with it the connecting rod 21, the axis of which moves constantly in a single straight line.

The effect of this movement of connected pistons 15 and 17 is to cause the link 37 to approach a horizontal position, the piston 34 moving downward and the pin 35 moving outwardly, that is, upwardly to the right as seen in Figure 1, thereby causing the piston 18 and the connecting rod 22 to move in the same direction compressing the charge in cylinder 10 which is next to fire. During this step it will be noted that the main shaft 25 is moved in a clockwise direction but the contra shaft is revolving in a counterclockwise direction about its alined pivots 42. After the link 37, which is one of the two central elongated crank arms, reaches horizontal the cylinder 10 is about ready to fire and the connecting rod 21 is still moving downwardly. The pin 34 passes the axis of the main shaft, however, just before the full force is exerted so that the firing of cylinder 10 causes the compression in cylinder 12. When the link 37 is vertical the connecting rod 22 and piston 18 are still moving downward and the cylinder 12 does not fire until after the link 37 has taken a position at right angles to the axis of the connecting rod 22. The firing of cylinder 13 causes piston 18 and connecting rod 22 to move upwardly to the right this causing the connected pistons 15 and 17 to move to the position illustrated in Figure 1, completing the cycle.

Although a six cylinder motor is illustrated in Figure 1, it is to be understood that the same crank shafts and the same crank case could be used without change in a three cylinder motor either by leaving off the three lower cylinders 11, 12 and 13 with their pistons and rods or by omitting cylinders 10, 12 and 14 with their pistons and rods. It will be seen that the angle between the cylinders is in the first case 60° as in the six cylinder motor and in the second case is 120°. In a four cylinder engine the angle between cylinders is $$\frac{360}{2 \times 4}$$

or 45° where the cylinders are not opposed or is $$\frac{360}{2 \times 2}$$

or 90° where the cylinders are opposed there being $n$ pairs of cylinders in the opposed type and $n$ cylinders in the V-type; obviously the V-type is in effect merely the upper half of the opposed type. In the V-type the smallest angle between cylinders is preferably $$\frac{360}{2n}$$

degrees.

What I claim is:

1. In a power converting device, a two part main shaft, a plurality of pairs of opposed cylinders along said shaft at different angles, pistons in said cylinders, a connecting rod connecting each pair of opposed pistons, linkage connecting said connecting rods, said linkage consisting of a contra shaft mounted to turn as a whole about the axis of said main shaft and simultaneously about its own axis.

2. In a power converting device, a pair of spaced alined journals, a crank pivoted in each journal, a contra shaft carried in the free ends of said cranks, said contra shaft consisting of a plurality of cranks rigidly connected together by crank pins, a plurality of pairs of opposed cylinders positioned along said contra shaft and equiangularly located about the axis of said journals, a connecting rod connecting each pair of pistons, each rod being connected to one of said crank pins, the throw of all of said cranks being equal and said crank pins being located equiangularly about the axis of said contra shaft.

3. A compound crank shaft comprising a pair of spaced alined shaft portions, cranks fixed to said portions, crank pins carried by the free ends of said cranks, a contra shaft mounted to turn on said pins, said contra shaft consisting of four rigidly connected arms, a journal in the free ends of two of said arms engaging said crank pins, a crank pin in the other end of each of said two arms fixedly connecting the same to the other two arms and a crank pin rigidly connecting said other two arms, said three contra shaft crank pins being distributed equi-angularly about the axis through said first mentioned crank pins.

4. In a power converting device, a main shaft consisting of two axially spaced shaft portions, $n$ cylinders spaced axially along and angularly about the common axis of said shaft portions, pistons in said cylinders, cranks at the proximate ends of said shaft portions, a contra shaft supported by said cranks and adapted to turn as a whole about said axis, $n$ crank pins on said contra shaft and connecting rods connecting said pins to the respective pistons in said cylinders, the smallest angle between said cylinders being $$\frac{360}{2n}$$

degrees, $n$ being any whole number above one.

5. In an engine, a crank case, aligned bearings at opposite ends of said crank case, a shaft in each bearing, a crank on the inner end of each shaft, a crank pin on the free end of each crank, a rigid contra shaft supported by said pins and thereby constrained to turn as a whole about the common axis of said shafts, $n$ transverse webs in said crank case, a guide slot in each web, a cross head adapted to reciprocate in each slot, $n$ cylinders attached to said crank case and aligned respectively with said guide slots, a piston in each cylinder, a connecting rod connecting each piston to its respective cross head, said contra shaft connecting said cross heads, said cylinders being angularly spaced above the common axis of said aligned shafts, the smallest angle between the cylinders being $$\frac{360}{2n}$$

degrees where $n$ is any whole number greater than one, and means for transferring power between said aligned shafts and some other mechanism.

6. The device of claim 4 in which said shaft portions and said contra shaft are counterbalanced and a fly wheel is provided on one of said portions.

7. In a power converting device, a pair of spaced axially aligned journals, a shaft pivoted in each journal, equal crank arms on the proximate ends of said shafts, a contrashaft carried in the free ends of said crank arms, said contrashaft consisting of a plurality of cranks rigidly connected together by crank pins, $n$ cylinders positioned along said contrashaft and equi-angularly located above the common axis of said journals and connecting rods connecting the pistons to their respective crank pins, the angle between adjacent cylinders being $$\frac{360}{2n}$$

degrees where $n$ is any whole number greater than one.

WILLIAM L. FRAMPTON.